United States Patent
Rastegar et al.

(10) Patent No.: US 7,154,392 B2
(45) Date of Patent: Dec. 26, 2006

(54) WIDE-AREA INTRUDER DETECTION AND TRACKING NETWORK

(76) Inventors: Jahangir S. Rastegar, 11 Wilderness Path, Stony Brook, NY (US) 11790; Carlos M. Pereira, 1117 Oak Hill Rd., Tannersville, PA (US) 18372

( * ) Notice: Subject to any disclaimer, the term of this patent is extended or adjusted under 35 U.S.C. 154(b) by 31 days.

(21) Appl. No.: 10/888,379

(22) Filed: Jul. 9, 2004

(65) Prior Publication Data

US 2006/0007001 A1    Jan. 12, 2006

(51) Int. Cl.
*G08B 13/18*    (2006.01)
(52) U.S. Cl. ............. 340/552; 340/553; 340/539.22; 340/551; 342/65; 342/357.07; 342/453; 342/450; 455/500; 701/219
(58) Field of Classification Search ........... 340/552, 340/539.22, 870.1, 539.13; 342/28, 174, 342/188, 58, 357.02, 453, 465, 450; 701/219; 455/500
See application file for complete search history.

(56) References Cited

U.S. PATENT DOCUMENTS

| | | | |
|---|---|---|---|
| 3,886,549 A | * | 5/1975 | Cheal et al. ............. 342/28 |
| 4,697,184 A | * | 9/1987 | Cheal et al. ............. 342/28 |
| 6,531,965 B1 | * | 3/2003 | Kaiser et al. .......... 340/870.01 |
| 6,710,736 B1 | * | 3/2004 | Fullerton et al. .......... 342/28 |
| 6,822,604 B1 | * | 11/2004 | Hall et al. ............. 342/28 |

* cited by examiner

*Primary Examiner*—Jeffery Hofsass
*Assistant Examiner*—Edny Labbees
(74) *Attorney, Agent, or Firm*—Scully, Scott, Murphy & Presser, P.C.

(57) ABSTRACT

A method is provided for at least one of detecting and tracking an object within a wide-area. The method including: deploying three or more sensors within the wide-area, each of the sensors having one or more polarized radio frequency waveguides; transmitting polarized radio frequency radiation from at least one source; detecting a reflection of the transmitted polarized radio frequency radiation; and calculating one of a detection or position of an object within the wide-area based on the detected reflection. At least one of the three or more sensors and at least one source can be a mobile platform, which can be manned or unmanned. The three or more sensors can be deployed manually or remotely, such as from a projectile.

24 Claims, 2 Drawing Sheets

WIDE-AREA INTRUDER DETECTION AND TRACKING NETWORK

BACKGROUND OF THE INVENTION

1. Field of the Invention

The present invention relates generally to wide-area intruder detection and tracking networks, and more particularly, to the use of a plurality of RF waveguide sensors for detecting and tracking objects, including people, within a wide-area.

2. Prior Art

In recent years, numerous sensors and sensory systems have been developed to detect and track intruders. Many of these sensors have found applications in safety, homeland security and other similar civilian and military areas. For sensors used in such applications they must be made to be relatively small and be assembled in small packaging. The sensors must also require low power, be capable of remote operation, and may be required to be capable of one- or two-way communication with a central station or networked using some wireless technology.

To monitor a wide area for intrusion and tracking of the intruders, a network of appropriate sensors is required. To make such a network practical, it is highly desirable for all the nodes except a few where the data is collected and analyzed to be passive. This is in fact necessary if the network is to be deployed from a distance into hard to reach areas, areas that are contaminated by chemical or biological or other similar hazardous materials or an area suspected of being occupied by hostile elements such as terrorists. In any case, it is preferable that the nodes, even those that are active, have low power requirements.

There are several types of sensors known in the art for detection and tracking of objects, including acoustic, visual, RF sensors and radar systems. Some factors that need to be considered for the detection and tracking of objects are the purpose of the network, ease of access to the nodes, available methods of powering each node (if any), physical size and weight of the sensors, the complexity of the data received (which determines the amount of signal processing that needs to be performed prior to transmission of the data), signal-to-noise ratio that can be tolerated, the requirements for sensor (node) concealment, and the requirements for signal stealthness and/or security.

Acoustic sensors can be considered in two categories—active or passive sensors. Microphones serve as passive acoustic sensors in that acoustic signals are received at the sensor without signals being transmitted from the sensor. While passive acoustic sensors offer the advantage of low power consumption, their sensing range is very short and the signal-to-noise ratio of these sensors is relatively poor. Active sensors, such as ultrasonic sensors, include a transmitting and receiving capability. Active acoustic sensors offer the advantage of locating the position of an object simply from a single sensor (location of objects can be achieved with passive acoustic sensors but at least two sensors are required for triangulation). However, active acoustic sensors draw significant power to pulse the acoustic membrane to transmit the ultrasonic signal and their range is too short to cover distances measured in kilometers rather than tens of meters.

Visual sensors offer better signal-to-noise ratio than acoustic sensors. The field of view and range of visual sensors depends on the optical system interfacing the observed scene to the pixel array of visual sensing elements. Visual information can be pre-processed on the sensor using pattern recognition algorithms and only if the processed data indicates a change in the scene, the visual information may be transmitted. Visual sensors may be used in the visible or infrared part of the electromagnetic spectrum. Each has advantages and disadvantages. Visible sensors offer higher signal-to-noise ratio than infrared sensors during the day but are poorer at night. Both sensors can be made to operate at moderately low power. The data processing, however, may require relatively fast processor speed and therefore consume significant power since real time signal processing is required for the present application. Tracking of objects can be relatively easily achieved in optical systems if the fields of view of adjacent sensors overlap since as an object moves from one sensor field of view to another, a hand off communication protocol can be used to pass the information along the sensor network. Visual sensors also have relatively short range for use with a wide-area intruder detection and tracking network where hundreds of square miles needs to be monitored with relatively few nodes. Visual sensors also only work for line-of-site detection and are relatively large and delicate.

Radar systems are presently widely deployed for detection and tracking systems. The size of the antenna and the frequency of the RF signal govern the precision and accuracy with which objects are located. Atmospheric attenuation is large at high frequencies and so low frequency radar is generally required, which requires a large physical size for the antenna. Scanning of scenes can be performed by either mechanically rotating the antenna or by modulating the signal phase to individual elements in an antenna array (smart antennas). The physical size and power requirements for radar systems precludes their use in sensor networks for monitoring and tracking of objects in border security systems envisaged in the proposed network of sensors.

Networks of sensors require communication between the individual nodes. Significant work has been done developing communication protocols for such networks to minimize power consumption, allow for establishing relative locations of sensor nodes in ad hoc networks, and ensuring network continuity in the event of loss of a single node (or multiple nodes) in the network.

SUMMARY OF THE INVENTION

Therefore it is an object of the present invention to provide a wide-area intruder detection and tracking network that overcomes the disadvantages associated with the prior art.

Accordingly, a method is provided for at least one of detecting and tracking an object within a wide-area. The method comprising: deploying three or more sensors within the wide-area, each of the sensors having one or more polarized radio frequency waveguides; transmitting polarized radio frequency radiation from at least one source; detecting a reflection of the transmitted polarized radio frequency radiation; and calculating one of a detection or position of an object within the wide-area based on the detected reflection.

The deploying can comprise manually placing the three or more sensors within the wide-area. The deploying can also comprise remotely placing the three or more sensors within the wide-area. The remotely placing can comprise deploying the three or more sensors with a projectile.

The method can further comprise aligning at least one of the three or more sensors to more fully receive the transmitted radio frequency radiation. The aligning can comprise mounting the at least one of the three or more sensors to a movable base and moving the base to a position which more fully receives the transmitted radio frequency radiation.

The method can further comprise self-calibrating the three or more sensors and at least one source to determine the location of the three or more sensors and at least one source subsequent to the deploying. In which case, the method can further comprise updating the self-calibrating at regular intervals.

Where each of the three or more sensors and at least one source have an orientation with respect to each other, the method can further comprise reconfiguring the orientation of at least one of the three or more sensors and at least one source with respect to each other.

At least one of the three or more sensors and at least one source can be a mobile platform. The mobile platform can be manned or unmanned.

Also provided is a system for at least one of detecting and tracking an object within a wide-area. The system comprising: three or more sensors disposed within the wide-area, each of the sensors having one or more polarized radio frequency waveguides; at least one source for transmitting polarized radio frequency radiation; a detector for detecting a reflection of the transmitted polarized radio frequency radiation; and a processor for calculating one of a detection or position of an object within the wide-area based on the detected reflection.

The system can further comprise means for manually deploying the three or more sensors within the wide-area.

The system can further comprise means for remotely deploying the three or more sensors within the wide-area. The means for remotely deploying can comprise a projectile having the three or more sensors deployable therefrom.

The system can further comprise means for aligning at least one of the three or more sensors to more fully receive the transmitted radio frequency radiation. The means for aligning can comprise a movable base having at least one of the three or more sensors mounted thereto and means for moving the base to a position which more fully receives the transmitted radio frequency radiation.

The system can further comprise means for self-calibrating the three or more sensors and at least one source to determine the location of the three or more sensors and at least one source. In which case, the system can comprise means for updating the self-calibrating at regular intervals.

Wherein each of the three or more sensors and at least one source have an orientation with respect to each other, the system can further comprise means for reconfiguring the orientation of at least one of the three or more sensors and at least one source with respect to each other.

At least one of the three or more sensors and at least one source can be a mobile platform. The mobile platform can be manned or unmanned.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

The present invention discloses a novel radio frequency (RF) waveguide sensory system for wide-area intruder detection and tracking. Although other types of delivery systems are possible, such as a manual deployment, a projectile-based delivery system is preferred, particularly where the wide-area to be monitored is a hostile territory or area or buildings contaminated or suspected of being contaminated with agents such as chemical, biological and radiative agents. Projectile delivery systems for the novel RF waveguide sensors disclosed herein are disclosed in co-pending U.S. patent application Ser. No. 10/888,361 the disclosure of which is incorporated herein in its entirety by its reference.

Figure 1:
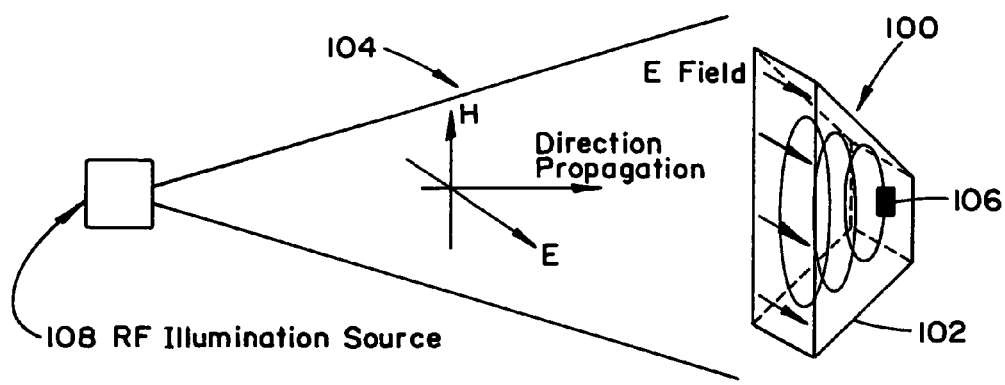
FIG. 1 illustrates a schematic of a polarized RF waveguide sensor for use in a wide-area intruder detection and tracking network.
Figure 2:
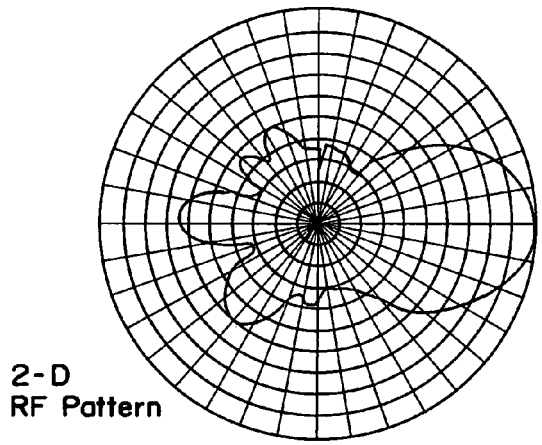
FIG. 2 illustrates a 2D RF pattern of a waveguide.

The RF waveguide sensors disclosed herein are capable of making the angular measurements directly. The RF waveguide sensors 100 use a combination of sectoral horn or other similar highly directional waveguide antenna horn 102, hereafter called "waveguide" and a polarized illumination beam 104, as shown in FIG. 1. A system or network employing the RF waveguide sensors 100 takes advantage of the directional sensitivity of the waveguides 102 to polarized microwave illumination emanation from a base source 108 that is transmitting a linearly polarized beam 104 with a specific orientation of the plane of polarity. The polarization thus establishes a known plane of reference as set by the source 108. The RF waveguide 102 has a sensor 106 positioned at a base of the horn 102. The sensor 106 is preferably designed to work in resonance and allows the system to take advantage of low attenuation of the illumination beam 104 in one axis and high attenuation in the other. In particular, the RF waveguide sensors 100 are sensitive to the input polarization in the H-plane and will attenuate the incoming energy in the plane orthogonal to the H-plane (i.e., the E-plane). A typical 2D RF pattern is shown in FIG. 2, the details of which are described in U.S. Pat. No. 6,724,341, the disclosure of which is incorporated herein in its entirety by its reference. The novel polarized RF waveguide sensors were developed for remote and onboard sensing of angular orientation by projectiles for guidance and control purposes. The principles of operation of the RF waveguide sensors are disclosed in U.S. Pat. No. 6,724,341, the disclosure of which is incorporated herein in its entirety by its reference.

As discussed above, the aforementioned RF waveguide sensors 100 can be in the form of sectoral horn antennas 102, and offer high gain and directivity and by using two or more antennas they can be used to detect and track intruders and objects as well as provide orientation information to manned (robotic) or unmanned mobile platforms patrolling the area or serving as nodes for a dynamic network. The RF waveguide sensors 100 can obviously work in both line-of-sight and not line-of-sight location of the RF source 108. When an object is located in the path between the RF source 108 and a RF waveguide sensor node 100 (referred to herein as simply a "node" or a "sensor node"), scattering of the electromagnetic waves will change the distribution of the received electric field intensity and polarization. By performing intelligent processing of the received signal at the RF source 108, at a sensor node 100, or at any other remote location, the data may be used to classify the object scattering the electromagnetic wave. The accuracy of this classification may be enhanced by data fusion from two or more RF waveguide sensor nodes 100. In addition to scattering from an intervening object, ground reflection and absorption can also be included in the analysis since these sensors can be located near ground level. In certain applications such as border crossings, a number of sensor nodes 100 may be mounted on manned or unmanned mobile platforms and for example border patrol cars to construct a dynamic network. In areas that are not clear, the scattering caused by buildings, trees, etc., may be considered and may require a high concentration of sensor nodes 100.

In the case of unmanned mobile platforms, the position and orientation of the mobile platform relative to the ground and the network and their respective speeds is thereby known onboard the mobile platform and can be used for its guidance and control purposes. The network is also continuously aware of the position and orientation and respective speeds of all the mobile platforms.

Taking into account the scattering from intervening objects can be achieved by solving a wave equation for electromagnetic waves scattered by a few different objects, specifically a human being, and typical vehicles used to illegally cross borders such as light trucks. Taking ground effects also into account, the intensity and polarization distributions received at a single sensor node 100 and at multiple sensor nodes 100 located at fixed separations from a main receiving sensor node 100 can be calculated. Each RF source 108 can send pulses at different times to simplify the processing of the collected data. Such a scheme is appropriate since the main purpose of both intruder detection and tracking and mobile platform position and angular orientation measurement involve nearly static conditions since the electromagnetic waves travel at the speed of light and considering the high frequency with which the RF pulses can be transmitted, even when tens or hundreds of emitting RF sources 108 are involved. For each different application and/or configuration of the network, the optimal locations of the sensor nodes 100 and their relative positions to the RF source 108 will need to be determined for obtaining the best signal-to-noise ratio and widest area coverage employing the minimum number of sensor nodes 100 and RF sources 108. The solution of the equations can be used to develop models and signal processing algorithms to classify the type of object interrupting the RF source 108 on its path to the sensor node(s) 100. Of course, the algorithms can be very code-efficient so that a low power embedded microcontroller may be used to process the data for object classification. One example of a code-efficient approach is a fuzzy logic methodology, which is well known in the art of image processing applications.

Accurate analytical expressions for the radiation characteristics of horn antennas can also be found in the art. To analyze the above antenna array and scattering problems, approximate closed-form solutions using a combination of scattering models for canonical conducting and dielectric objects available in the art need to be developed depending on the particular network configuration and/or application for the network. The diffraction effects of large but finite ground-plane and/or other nearby objects can also be approximately accounted for in models using Geometrical Theory of Diffraction (GTD), such models being well known in the art. These analytical models, however, will not include the effect of mutual couplings between the antenna elements and the coupling between two or more scattering objects that may be located in proximity of each other. To assess the range of validity of the analytical model, numerical models using commercially available electromagnetic simulation codes using Method of Moments (MOM) and/or Finite-Difference Time-Domain (FDTD) method can be developed. For example MOMbased Numerical Electromagnetic Code (NEC) can be used to wire-mesh model RF waveguide sensor node array interactions with arbitrary-shaped conducting objects, whereas the FDTD-based code XFDTD can be used to accurately model a combination of arbitrary-shaped conducting and/or dielectric objects. In addition NEC may be used to include the effect of ground reflection on the performance of the antenna-array/scattering system.

The power received by the sensor from the RF source 108 may be used to also supply power for the recharging of small batteries or capacitors used to power the electronics that could be added to the passive node platforms for additional capabilities such as the operation of biological and/or chemical sensors. Such sensors need to be operated very infrequently, thereby providing ample time to charge the aforementioned small batteries or capacitors. The amount of power generated using this method can be enough to power, for example, object recognition processors since such objects will be encountered very infrequently in most areas. The design of the charging circuitry and the signal processing electronics is considered to be within the knowledge of those of ordinary skill in the art and is not discussed in detail herein.

The charging circuitry can comprise a high frequency rectifier, such as a Schottky diode, and an impedance matching circuit (designed using passive R, L, C elements) to match the impedance of the receiving antenna to the battery. The impedance of the Schottky diode can incorporate the packaging impedance of the Schottky diode. Such parameters are generally available from the manufacturers of these diodes. The impedance of the battery can be measured and an equivalent circuit extracted for use in the impedance matching circuit design. The battery impedance measurements on a small, rechargeable lithium ion cell can be made using a Solartron 1280B Electrochemical Measurement Unit under CorrWare software control and the equivalent circuit extracted using Zplot software (which uses nonlinear least squares curve fitting analysis to extract equivalent circuit parameters for electrochemical systems).

The signal processing for the wide-area detection and tracking network disclosed herein should be performed with low power electronics. Low power digital signal processor (DSP) chips and/or embedded microcontrollers can be utilized. The signal processing algorithms must be intelligent and make decisions regarding transmission of data. For example, if no intrusion has taken place, no signal should be transmitted but if a sensor detects an object, then it should notify a central command post or active station 108 so that appropriate action may be taken. The active station 108 may also contain a waveguide sensor 100 and one or more of the active stations can be mobile.

The receiving antenna may also be used as a transmitting antenna for wirelessly transmitting intrusion information into the field-of-view of the detectors. By preprocessing the signal on the RF waveguide sensor node 100 itself, a communication data rate may be kept very low (resulting in low frequency, low power data transmission). Several low power commercial RF transceiver units are commercially available. An example of such a device is the Chipcon CC400 chip. This wireless transceiver chip has a programmable carrier frequency of 300–500 MHz and has a current consumption of 10 mA and 5V during signal transmission with a data rate of 9,600 baud and range of 100 m. Similar hardware is readily available for other carrier frequencies and with much larger ranges. In general, frequencies in higher GHz ranges are desired to be used in order to reduce the size of the sensors and illuminating sources.

Figure 5:
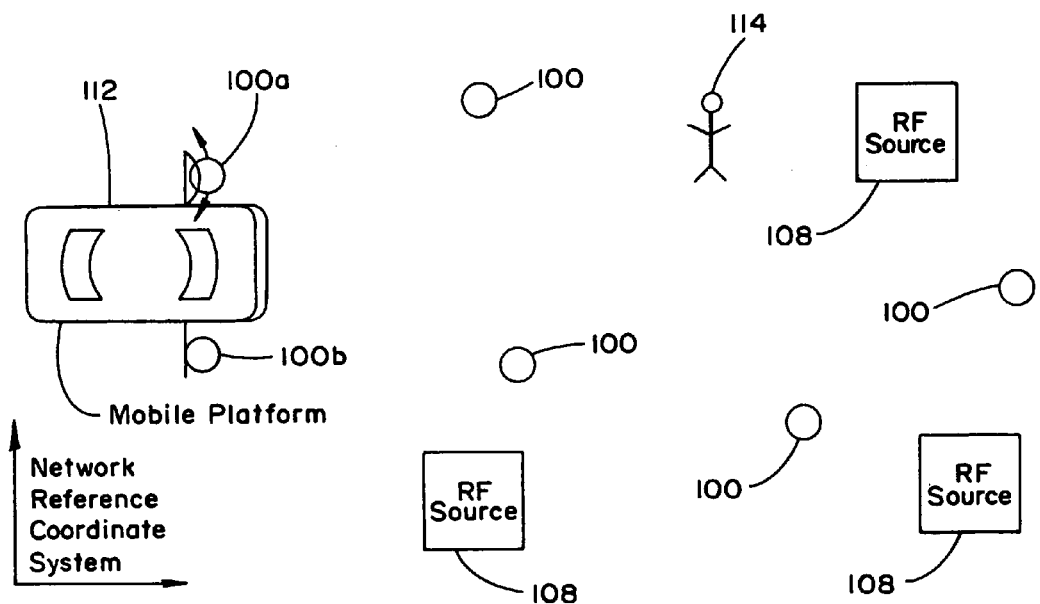
FIG. 5 illustrates a schematic of a network of polarized RF waveguide sensors having a mobile platform.

Referring now to FIG. 5, there is shown a sensor network 116 having a mobile platform 112, such as a vehicle. The position of a mobile platform 112 in the network plane (usually represented by a fixed Cartesian or other similar coordinate system, hereinafter called the "network reference coordinate system" or in short the "reference system") is determined in a manner similar to that of the intruding objects. The position of a mobile platform 112 may also be determined from triangulation of signals received from two or more illuminators 108 or signals reflected from known sensors 100, using the time taken for the signal to reach the mobile platform 112. The mobile platform 112 can have one or more sensor nodes 100 disposed thereon and/or an RF source 108.

Signals received from two or more illuminators 108 can also be used to determine the position of a mobile platform 112 in the reference system and its orientation in the reference system as follows. The position of the mobile platform 112 is first determined by the time taken for the signals from each of the two illuminating sources 108 to reach the mobile platform 112. The time taken for the signal to reach the mobile platform 112 provides the instantaneous distance from each source 108 to the mobile platform 112. Since the position of the two sources 108 in the reference system and thereby the distance between them are known, the position of the mobile platform 112 is readily determined by solving for the angles of a triangle with three known sides. The angular orientation of the mobile platform 112 in the reference system is determined from the level of power received at a waveguide sensor 100a fixed on the mobile platform 112 from one of the illuminating sources 108. This is achieved since for a given distance between an illuminating source 108 and a waveguide sensor (receiver) 100, the level of power is a function of the their relative orientation, i.e., a function of their polarization mismatch. A typical (measured) such function is shown in FIG. 2. In general only one signal received from one illuminating source 108 is necessary to determine the angle between an illuminating source 108 and a waveguide sensor 100, 100a. However, at least two such angular measurements may be necessary since the pattern in FIG. 2 is symmetric and the same amount of power is received at two relative symmetrically positioned angles. The level of power received from two illuminating sources 108 allows the mobile platform sensor 100a to identify which one of the two aforementioned angles indicates the correct angular orientation of the mobile platform 112 in the reference system.

In cases, it may be necessary to have more than one waveguide sensor 100a, 100b mounted on mobile platforms 112 and directing in different directions so that at least one of the sensors 100a, 100b is directed towards one of the illuminating sources with a small enough angular misalignment to receive a detectable signal with relatively small noise level. In another embodiment of this invention, one or waveguide sensors 100a are mounted on the mobile platform 112 on a rotating indexed base 118 such that they can be used to scan certain angular range to best align themselves with the illuminating sources 108 to increase accuracy in angular orientation measurement and reduce the required illuminating source power level.

The transmitted signal from each source 108 is preferably a pulse that is transmitted with certain frequency. The distance, position and angular orientation information obtained from intruders or the mobile platform 112 at two consecutive, relatively short, time intervals can be used to calculate the corresponding velocity information.

As it was shown above, the signal from only one source 108 is required to determine the position (angular orientation) of the mobile platform 112 in the reference system. However, signals from more sources 108 may be used to more accurately determine the position and angular orientation of the mobile platform 112 by eliminating the effect of noise and disturbances.

Figure 3:
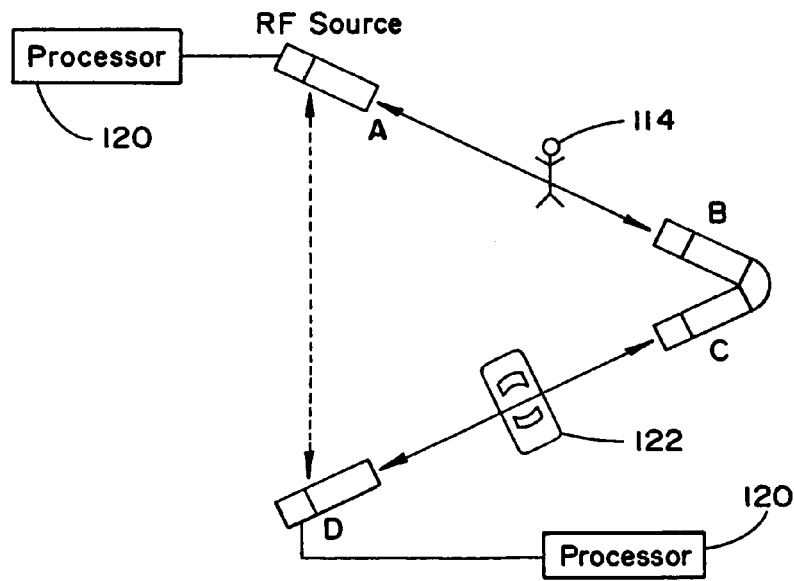
FIG. 3 illustrates a schematic of a simple network of three polarized RF waveguide sensors.

The novel polarized RF waveguide sensors 100 form the basis for the construction of a wide-area intruder detection and tracking sensor network. The network is capable of providing coverage for very large areas with relatively few and mostly passive nodes. A schematic of a simple network of polarized RF waveguide sensor nodes 100 is shown in FIG. 3. Here, a RF waveguide sensor A is mounted on an active node and is also the source 108 of polarized RF signal and will provide a low strength signal. A RF waveguide sensor B is shown oriented and tuned to best receive the incoming signal from the RF source A, and transmit the signal to a sensor D through a sensor C. The sensor D may be the data collection node or may be used to send the transmitted signal back to the source waveguide A. Thus, either sensor D or sensor/source A also includes a processor 120 for carrying out the calculations discussed above. Alternatively, the platform of the sensor D may be equipped with a second waveguide sensor (not shown) to send the signal back to a second waveguide sensor (not shown) on the platform of the RF source A. Noting that the sensors are primarily used to detect intrusions and not to provide for a high bandwidth data transmission, only a very low amount of power is required to establish the required links. In addition, the distance between the source A and the sensors B, C, D and between the sensors B, C, D can be relatively large and that a larger number of passive sensors (sensors B, C and D) may be added following the sensor D. When an intruder 114 or a vehicle 122 is in the field of the transmitting sensor A (or the transmitting sensor C), the scattering of the electromagnetic energy will occur which will affect the field intensity and polarization of the received signal at the sensor B (or D).

The problem of multiple objects detection is an extension of that of single object detection. When two intrusions 114, 122 cross the signal path simultaneously, the active station (or node) A only detects the closest intrusion. But both intrusions can be resolved if enough time elapses. Time to resolve such situation depends on the information processing speed at the active station A.

Figure 4:
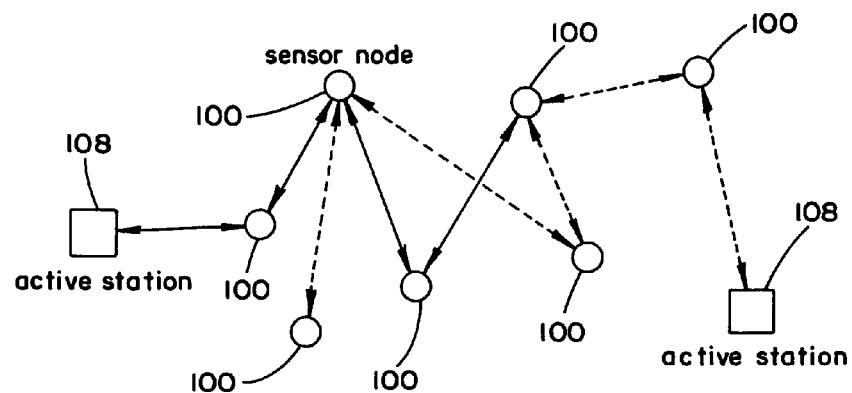
FIG. 4 illustrates a schematic of a network of polarized RF waveguide sensors having multiple RF sources (active stations).

For reliability of connectivity as well as detection, and determination of sensor coordinates, one active station creating single connectivity may not be sufficient. For that reason, redundancy in the network connectivity can be introduced. For example, multiple active stations can create multiple networks utilizing the deployed sensor nodes. This is also illustrated in FIG. 4 where two networks are overlaid. Different active stations (RF sources 108) may share sensor nodes 100. In this case, the complexity of each sensor node 100 is increased. Because of redundancy, more information will be available to make accurate detection. From the sensor node 100 perspective, sharing the sensor nodes 100 between active stations 108 implies that each sensor node 100 should have the capability of sending signals to multiple destinations as well as the ability to distinguish signals from the other sensor nodes 100. While sharing can increase the effectiveness of detection, the complexity of sensor nodes 100 may increase.

In certain applications, the sensor nodes 100 (and when necessary the illuminating sources A) are deployed by the aforementioned projectiles, or dropped into intended area or placed at the intended location without undergoing a careful alignment with the other nodes and illuminating sources. Such deployment methods may be needed, for example when deployment is into a hostile area, an area or structure or building suspected of housing chemical or biological or other types of hazardous materials or of being occupied by hostile elements. Such deployment methods may also be necessary for deploying the nodes in hard to reach area. In all such situations, it is highly desirable for the waveguide sensors and the illuminating sources to have self-aligning capability in order to increase the signal received at the nodes, reduce the illuminating source power requirement, increase the chances of bringing more of the nodes on-line, and reduce the chances of detection by reducing the level of the illuminated power.

The sensor nodes 100 and/or the illuminating sources 108 can have a self-aligning capability. The self-aligning capability of the nodes 100 and the illuminating sources 108 allows the waveguide sensors 106 at each node and associated illuminating source(s) to maximally align their directivity and the plane of polarity to maximize power reception and sensitivity to changes in the angular orientation measurement for mobile robots. The self-aligning capability of the sensor nodes and illuminating sources may also be used to vary the configuration of a network. The self-aligning capability of the RF waveguide sensors is disclosed in detail in co-pending U.S. application Ser. No. 10/888,485 the disclosure of which is incorporated herein in its entirety by its reference. With a self-aligning capability, which is preferred even in a network with single active stations 108, redundant networks can be created in time multiplex fashion. For example, multiple networks can be created but not at the same time instant. This scheme has an advantage of hiding the operation or making detection by external observers difficult. The complexity of the sensor nodes 100 and effectiveness of detection/monitoring is a tradeoff, which can be addressed in order to obtain an optimum connectivity for any particular application and network configuration.

In some cases, the position and orientation of the sensor nodes 100 and the illuminating sources 108 may not be exactly known with respect to the reference system. This is particularly the case when the sensor nodes and the illuminating sources are deployed from a distance, particularly in hard to reach places. In fact, even when the nodes 100 and the illuminating sources 108 are accessible to the deployment personnel, it may be more efficient to provide the network with self-calibration capability, i.e., with the capability to determine the location of the nodes 100 and the deployed illuminating sources 108 following deployment and with certain regularity to keep the network calibrated. This is particularly necessary in the presence of mobile platforms 112 serving as sensor nodes 100 and/or illuminating sources 108 since their position and orientation has to be updated at regular intervals.

In certain applications, a network model, which minimizes the complexity of the sensor nodes 100 is preferred. The construction of network topology with limited information from the sensor nodes 100 can also be achieved. However, finding out the absolute coordinate of the sensor nodes 100 may not be possible using only one active station 108. Several, if not many, active stations 108 can collaborate in order to construct 2-dimensional coordinates from limited information gathered by each individual active station 108. Once the coordinates of the sensor nodes 100 are known, detecting and monitoring an intrusion by an object (including a person) can be achieved. However, false detection is possible due to signal strength fluctuation due to terrain. Hence the signal path alignment is very critical for creating a reliable network.

Those skilled in the art will appreciate that the novel Polarized Radio Frequency Waveguide Sensors (PRFWS) which form the basis for the construction of the present Wide-Area Intruder Detection and Tracking Sensor Network provides the means to cover very large areas with mostly passive nodes. The PRFWSs take advantage of the antenna directivity, and manipulation of the beamwidth, antenna gain, operation at resonance, and the ability of the passive sensors to communicate to other passive and active sensors to allow for network operation with mostly passive nodes. In addition, those skilled in the art will also appreciate that certain sensor nodes may be made to be mobile in order to make the network reconfigurable to adapt to the surrounding environment, particularly for situations in which the network is deployed from a safe distance inside a warehouse or building or area contaminated with chemical or biological agents or other hazardous materials. Such a mobile node may be manned (such as a vehicle) or unmanned (such as a mobile robot). Mobile robots are particularly useful for distant deployment in a hostile or contaminated environment.

Those skilled in the art will also appreciate that the Polarized Radio Frequency Waveguide Sensors (PRFWS) and networks of the same sensors offer significant advantages over existing sensor networks. The primary advantage of such a sensor is its low power consumption. The polarized RF sensor itself is a passive sensor with the RF source feeding the sensors being located remotely from the RF sensor. The detection and signal conditioning circuitry can be maintained at low power levels. Handing off signals between sensors in a network can be used to locate intruders and/or objects and perform intruder and/or object tracking. The distribution of phases and intensities at two sensors can be used to determine the distance of an intruder or object from a sensor and its relative size to prevent false alarm from smaller objects or animals. For the case of mobile nodes and platforms, by simple scanning of the intensity of the received polarized RF signal (using a limited array of polarized RF sources), the angular location of the mobile platforms can be ascertained.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for at least one of detecting and tracking an object within a wide-area, the method comprising:

deploying three or more sensors within the wide-area, each of the sensors having one or more polarized radio frequency waveguides;

transmitting polarized radio frequency radiation from at least one source;

detecting a reflection of the transmitted polarized radio frequency radiation; and calculating one of a detection or position of an object within the wide-area based on the detected reflection.

2. The method of claim 1, wherein the deploying comprises manually placing the three or more sensors within the wide-area.

3. The method of claim 1, wherein the deploying comprises remotely placing the three or more sensors within the wide-area.

4. The method of claim 3, wherein the remotely placing comprises deploying the three or more sensors from a projectile.

5. The method of claim 1, further comprising aligning at least one of the three or more sensors to more fully receive the transmitted radio frequency radiation.

6. The method of claim 5, wherein the aligning comprises mounting the at least one of the three or more sensors to a movable base and moving the base to a position which more fully receives the transmitted radio frequency radiation.

7. The method of claim 1, further comprising self-calibrating the three or more sensors and at least one source to determine the location of the three or more sensors and at least one source subsequent to the deploying.

8. The method of claim 7, further comprising updating the self-calibrating at regular intervals.

9. The method of claim 1, wherein each of the three or more sensors and at least one source have an orientation with respect to each other, the method further comprising reconfiguring the orientation of at least one of the three or more sensors and at least one source with respect to each other.

10. The method of claim 1, wherein at least one of the three or more sensors and at least one source is a mobile platform.

11. The method of claim 10, wherein the mobile platform is manned.

12. The method of claim 11, wherein the mobile platform is unmanned.

13. A system for at least one of detecting and tracking an object within a wide-area, the system comprising:
three or more sensors disposed within the wide-area, each of the sensors having one or more polarized radio frequency waveguides;
at least one source for transmitting polarized radio frequency radiation;
a detector for detecting a reflection of the transmitted polarized radio frequency radiation; and
a processor for calculating one of a detection or position of an object within the wide-area based on the detected reflection.

14. The system of claim 13, further comprising means for manually deploying the three or more sensors within the wide-area.

15. The system of claim 13, further comprising means for remotely deploying the three or more sensors within the wide-area.

16. The system of claim 15, wherein the means for remotely deploying comprises a projectile having the three or more sensors deployable therefrom.

17. The system of claim 13, further comprising means for aligning at least one of the three or more sensors to more fully receive the transmitted radio frequency radiation.

18. The system of claim 17, wherein the means for aligning comprises a movable base having at least one of the three or more sensors mounted thereto and means for moving the base to a position which more fully receives the transmitted radio frequency radiation.

19. The system of claim 13, further comprising means for self-calibrating the three or more sensors and at least one source to determine the location of the three or more sensors and at least one source.

20. The system of claim 19, further comprising means for updating the self-calibrating at regular intervals.

21. The system of claim 13, wherein each of the three or more sensors and at least one source have an orientation with respect to each other, the system further comprising means for reconfiguring the orientation of at least one of the three or more sensors and at least one source with respect to each other.

22. The system of claim 13, wherein at least one of the three or more sensors and at least one source is a mobile platform.

23. The system of claim 22, wherein the mobile platform is manned.

24. The system of claim 23, wherein the mobile platform is unmanned.

* * * * *